(12) United States Patent
Lambard et al.

(10) Patent No.: US 6,485,584 B1
(45) Date of Patent: Nov. 26, 2002

(54) METHOD OF MANUFACTURING A FERRITIC-MARTENSITIC, OXIDE DISPERSION STRENGTHENED ALLOY

(75) Inventors: Véronique Lambard, L'Hay Les Roses (FR); Ana Alamo, Voisins le Bretonneux (FR); Jean-Louis Seran, Verrieres le Buissron (FR)

(73) Assignee: Commissariat a l'Energie Atomique, Paris (FR)

(*) Notice: Subject to any disclaimer, the term of this patent is extended or adjusted under 35 U.S.C. 154(b) by 0 days.

(21) Appl. No.: 09/286,756

(22) Filed: Apr. 6, 1999

(30) Foreign Application Priority Data

Apr. 7, 1998 (FR) .............................. 98 04325

(51) Int. Cl.[7] .............................. B22F 7/00; C21D 1/18
(52) U.S. Cl. ...................... 148/514; 148/605; 148/621; 148/325; 148/334
(58) Field of Search .................. 148/514, 579–664, 148/320–327, 605, 621, 325, 334

(56) References Cited

U.S. PATENT DOCUMENTS

| 4,075,010 A | 2/1978 | Fischer | 75/235 |
| 4,960,562 A | 10/1990 | Okuda | 376/416 |
| 4,963,200 A | * 10/1990 | Okuda et al. | 148/325 |
| 5,032,190 A | * 7/1991 | Suarez et al. | 148/11.5 |
| 5,167,728 A | * 12/1992 | Weber | 148/514 |
| 5,310,431 A | 5/1994 | Buck | 148/325 |

FOREIGN PATENT DOCUMENTS

| EP | 0 258 969 | 3/1988 | C23C/8/50 |
| GB | 2 219 004 | 11/1989 | C22C/32/00 |
| JP | 63-186853 | 8/1988 | C22C/38/22 |
| JP | 01272746 | 10/1989 | C22C/38/22 |
| JP | 02225648 | 9/1990 | C22C/38/00 |

* cited by examiner

Primary Examiner—George Wyszomierski
Assistant Examiner—Janelle Combs Morillo
(74) Attorney, Agent, or Firm—Anderson Kill & Olick; Eugene Lieberstein; Michael N. Meller

(57) ABSTRACT

This invention relates to a method of manufacturing an improved ferritic or martensitic alloy based on iron and chromium strengthened by a dispersion of oxides, commonly called an Oxide Dispersion Strengthened or ODS alloy, and, more particularly to a method of manufacturing a ferritic or martensitic ODS alloy with large grains based on iron and chromium which has a single phase ferritic or martensitic matrix having an isotropic microstructure and a grain size that is sufficient to guarantee mechanical strength compatible with a use of this alloy at high temperature and/or under neutron irradiation. According to the invention, the method comprises slow cooling of an austenite at a cooling rate less than or equal to the critical cooling rate for transformation of this austenite into ferrite.

19 Claims, 2 Drawing Sheets

METHOD OF MANUFACTURING A FERRITIC-MARTENSITIC, OXIDE DISPERSION STRENGTHENED ALLOY

TECHNOLOGICAL FIELD OF THE INVENTION

This invention relates to a method of manufacturing an improved ferritic or martensitic alloy, including chromium and which is strengthened by a dispersion of oxides, commonly called an ODS (Oxide Dispersion Strengthened) alloy, and more particularly, to a method of manufacturing a ferritic or martensitic ODS alloy with large grains based on iron and chromium which has single phase ferritic or martensitic matrix having an isotropic microstructure and a grain size that is sufficient to guarantee mechanical strength compatible with a use of this alloy at high temperature and/or under neutron irradiation.

ODS alloys are made up of a metal matrix having a body-centered cubic crystal structure. This structure is strengthened by a dispersion of oxides of the type $Y_2O_3$, $TiO_2$ etc. which gives it excellent mechanical and chemical properties at medium and high temperatures.

The resistance to oxidation of these alloys is due particularly to the presence of chromium. This resistance is only effective when the concentration of chromium is greater than 8% by weight in the alloy. However, when this concentration is greater than 12% by weight, the alloy becomes brittle.

Furthermore, thanks to their crystal structure, these alloys have good resistance to swelling and to creep under neutron irradiation.

These alloys can be used, for example, as structural materials for components in the core of a nuclear power station since these components must have a high mechanical strength at high temperature, for example from 400 to 700° C., must be resistant to neutron radiation, must be compatible with use in a sodium environment and resistant to oxidation etc.

In a general way, these alloys are also useful in the manufacture of components subject to high mechanical and thermal stresses such as components of thermal power stations, components used in the glass, gas or aeronautical industries etc.

PRIOR ART

Many types of ODS alloys that include chromium have already been developed in the prior art. These have chromium concentrations between 13 and 20%, variable contents of Mo, W, Al and Ti, and a small quantity of carbon, generally less than 0.02% by weight (200 ppm). In this type of alloy, the matrix is totally ferritic whatever the heat treatment temperature.

Hence, American U.S. Pat. No. 4,075,010 describes an alloy having a composition Fe-14 Cr-1 Ti-0.3 Mo-0.25 $Y_2O_3$.

This alloy displays a very good compromise between strength and ductility in a direction parallel to the axis of forming of the alloy. However the grains that make it up are elongated in the direction of forming which leads to a high degree of anisotropy in its mechanical properties. This anisotropy leads to too low a mechanical strength along directions perpendicular to the direction of forming. Such an alloy can therefore not be used, for example to make cladding tubes for nuclear reactors, since the radial direction is the main direction of mechanical stress in these tubes in a reactor. In addition, this alloy contains a high level of chromium which causes it to become brittle under neutron radiation through the precipitation of phases rich in this element.

This type of alloy generally produced by mechanical alloying from its constituents starting with elemental or pre-alloyed powders. In this type of alloy, mechanical alloying is a method that allows one to introduce into the metal matrix, the fine and homogeneous distribution of oxides that confers a very high hot strength on the alloy. The powders thus provided are compacted and drawn at high temperature and pressure.

This method of production however produces an alloy in which the mean grain size is generally too small, that is to say less than 1 μm and which has an anisotropic microstructure when the initial chemical composition of the matrix means it has a ferritic structure. Under these conditions, too small a grain size causes a reduction in the mechanical strength of the alloy, particularly at high temperatures greater than 500° C. Furthermore, the anisotropy of the grain size leads to anisotropy in the mechanical properties of the alloy.

In particular, the initial ferritic structure is inevitable in examples that contain more than 12% of chromium.

In order to avoid these problems of anisotropy, a man skilled in the art has been drawn into using a martensitic material less rich in Cr, but in this case, control of the mean grain size has proved to be impossible. In effect, in this type of material, no variation in grain size whatsoever has been observed after traditional heat treatment even at temperatures as high as 1250° C.

Patent application GB-A-2 219 004 describes an ODS alloy with a tempered martensitic matrix having a chromium concentration of from 8 to 12% by weight and concentrations of (Mo+W) and of carbon respectively between 0.1 and 4% and 0.05 and 0.25% by weight. In addition, the alloy described is strengthened by a dispersion of $Y_2O_3$ and $TiO_2$ oxide particles at a concentration of from 0.1 to 1% by weight. The application examples described in this document include a chromium concentration greater than 10% by weight and a concentration of Mo and W between 2 and 4% by weight. The preparation method of the alloy described comprises mechanical alloying of the alloy in an attritor, compaction of the alloy under vacuum and hot drawing at a temperature ranging from 900 to 1200° C. This procedure is followed by a normalization treatment at a temperature ranging from 950 to 1200° C. and a tempering at a temperature ranging from 750 to 820° C.

However the method described does not allow one to control the grain size of the alloy.

The prior art methods therefore all have one or more of the following disadvantages

- they do not allow one to obtain an isotropic microstructure of the formed alloy,
- they do not allow one to specify and control the grain size of the alloy
- they lead to a grain size that remains too small.

As a consequence, the prior art alloys all have one or more of the following disadvantages:

- insufficient mechanical strength at high temperature due to the anisotropy of its microstructure,
- embrittlement at high temperature and/or under neutron irradiation through precipitation of embrittling phases in the alloy due particularly to an excess of chromium, and
- a mechanical strength that is not always compatible with use at high temperature and/or under neutron irradiation due particularly to having no control over the grain size of the alloy and to the grain size being too small.

DESCRIPTION OF THE INVENTION

The precise purpose of this invention is to provide a method of manufacturing a ferritic ODS alloy that includes chromium, and a method of manufacturing a martensitic ODS alloy that includes chromium, which does not have the disadvantages mentioned above and which in particular, allows one to specify and control the grain size of the alloy produced by exercising control over successive phase transformations.

The method, according to the invention, of manufacturing an alloy with a ferritic ODS structure that includes chromium, comprises preparation of a martensitic ODS blank that includes chromium and a step consisting of subjecting the martensitic ODS blank to at least one thermal cycle comprising an austenitization of the martensitic ODS blank at a temperature greater or equal to the AC3 point of this alloy in such a way as to obtain an austenite, followed by cooling of this austenite at a slow cooling rate that is less than or equal to the critical cooling rate for transformation of this austenite into ferrite in such a way as to obtain an alloy with a ferritic structure, said slow critical cooling rate being determined from a phase transformation diagram for this austenite under continuous cooling.

The alloy manufactured by the method of the invention is notably improved since it has a single phase ferritic matrix having an isotropic microstructure and a grain size that is sufficient to guarantee mechanical strength compatible with use of this alloy at high temperature and/or under neutron irradiation. Furthermore, it has sufficient ductility to be subjected to forming even at ambient temperature.

According to the invention the martensitic ODS blank that includes chromium can be prepared by any method that allows one to obtain a blank in which the oxides are dispersed in the metal matrix in a fine and homogeneous manner.

In an advantageous way, the blank can be prepared from a pre-alloyed powder obtained by mechanical alloying. In effect the mechanical alloying makes possible the dispersion of oxides such as $Y_2O_3$ required for the preparation of an ODS alloy.

The mechanical alloying can be carried out in an attritor, under a neutral atmosphere, for example argon, starting with a powder, obtained, for example, by atomization of an ingot under argon, that has a composition which corresponds to that of the manufactured blank and by adding oxides such as $Y_2O_3$. The powder can also be obtained by mixing pure or pre-alloyed powders available on the market.

According to the invention, the martensitic ODS blank can be prepared by a traditional technique of consolidating a pre-alloyed powder for example by drawing and hot forming.

According to the invention, the martensitic ODS blank that includes chromium can also include one or more elements chosen from the group comprising Mo, W, Ni, Mn, Si, C, O, N, Y, Ti, Ta, V, Nb, Zr. For example, it can include one or more of the oxides currently used for manufacturing alloys strengthened by a dispersion of oxides, for example $Y_2O_3$, $TiO_2$, MgO, $Al_2O_3$, $MgAl_2O_4$, $HfO_2$, $ThO_2$ and $ZrO_2$. The function of each of these elements and oxides in the martensitic ODS blank is known to a man skilled in the art. As a consequence, it will not be described here.

According to the invention, the martensitic ODS blank that includes chromium can, for example, include from about 7 to about 12% by weight of chromium equivalent in the alloy, for example, to about 8 to about 11% by weight, that is to say a quantity of alphagenic elements equivalent to a quantity of chromium of about 7 to about 12% by weight, for example, from about 8 to about 11% by weight. The alphagenic elements are notably elements that allow one to reduce the area of the domain in which the austenite exists. The method according to the invention can therefore be applied advantageously to a type 9 Cr alloy.

According to the invention, the chromium can be at a concentration of from about 7 to about 12% by weight, for example from about 8 to about 12% by weight, Mo can be at a concentration of from about 0.3 to about 1.5% by weight, W can be at a concentration of from about 0.5 to about 3% by weight, Ni can be at a concentration ranging up to about 1% by weight, Mn can be at a concentration ranging up to about 1% by weight, Si can be at a concentration ranging up to about 1% by weight, C can be at a concentration of from about 0.02 to about 0.2% by weight, O can be at a concentration of from about 0.02 to about 0.3% by weight, N can be at a concentration ranging up to about 0.15% by weight, Y can be at a concentration ranging up to about 1% by weight and Ti can be at a concentration ranging up to about 1% by weight in the alloy, the remainder being iron.

According to the invention, this alloy can also include Ta and Nb, each at a concentration ranging up to about 0.2% by weight, V at a concentration ranging up to about 0.4% by weight, and Zr at a concentration ranging up to about 0.4% by weight.

The, at least one, thermal cycle according to the invention allows one to induce, in the martensitic ODS blank, a transformation of the martensite into austenite, then a slow transformation of the austenite into ferrite with a stable grain growth at low temperature.

According to the invention the, at least one, thermal cycle comprises an austenitization of the martensitic ODS blank at a temperature greater than or equal to the AC3 point for this alloy in such a way as to obtain an austenite. The AC3 point of such an alloy corresponds to the temperature at which the ferrite completely transforms itself into austenite in the course of the heating. When the alloy is an alloy such as those described above, this austenitization can be carried out at a temperature of from about 950 to about 1150° C., for example, at a temperature of from about 1000 to about 1100° C., for example at a temperature of about 1000° C. and for a period of from about 15 to about 120 minutes, for example, from about 30 to 90 minutes, for example a period of about 30 minutes, a period of less than 15 minutes often being insufficient to obtain an austenitic structure, and a period greater than 120 minutes not being necessary since the austenitic structure has often been obtained earlier.

According to this invention, this austenitization is followed by a cooling of the austenite obtained, at a slow cooling rate less than or equal to the critical rate of cooling for transformation of this austenite into ferrite, said slow cooling rate being determined from a phase transformation diagram for this austenite under continuous cooling. This phase transformation diagram, or TRC, can be obtained in a usual way.

The rate of cooling of the austenite is said to be "slow" in this description so as to differentiate it from the "fast" rate of cooling for a martensitic transformation described below in the method of manufacturing a martensitic ODS alloy according to the invention.

This slow cooling induces a transformation of the austenitic phase which is a high temperature phase into a ferritic phase which is more propitious than martensite for grain growth.

The slow rate of cooling can, for example, be less than or equal to 280° C. per hour, for example, for an alloy composition such as those previously described. For example, for at least one thermal cycle, it can be less than about 250° C. per hour, for example, less than or equal to about 100° C. per hour, for example, less than or equal to about 20° C. per hour. It should further be noted that the cooling rate depends, not only on the composition of the alloy manufactured, but also on the austenitization temperature of this alloy. It will be easily understood that in accordance with the constraints of industrial manufacture and in accordance with the composition of the alloy, a man skilled in the art can adapt the austenitization temperature and the slow rate of cooling of the method of the invention.

The inventors have observed that when the cooling rate is less than the critical rate of phase transformation of the austenite, there is an increase in the grain size in the alloy. They have also surprisingly observed that the lower the rate of cooling, the greater the grain growth in the alloy.

Very good grain growth has, for example, been observed by the inventors with a cooling rate of from about 5 to about 20° C. per hour. For example, for an alloy composition such as those previously described, a slow cooling rate less than 100° C. per hour gives an increase in the grain size of the manufactured ferritic alloy such that the mean grain size reaches 3 to 8 $\mu$m in this alloy.

This cooling can be controlled, for example, as far as 650° C. for the compositions previously mentioned, that is to say as far as the temperature at which the phase transformation is finished.

In this example, below 650° C., fast cooling can be applied.

After a first thermal cycle according to the invention, the martensitic ODS blank is transformed into an alloy with a ferritic ODS structure with a grain size greater than the old grain size of the austenite.

According to the invention, the thermal cycle can be repeated several times, with identical or different slow rates of cooling, which allows one to obtain additional growth in the grain size of the alloy with a ferritic ODS structure formed during a first cycle. It can be repeated until this growth ceases, that is to say until an optimization of the grain size of the ODS alloy is achieved. According to the invention, the thermal cycle can be, for example, repeated two, three or four times with an alloy composition such as those previously mentioned, optimization being obtained at the end of four cycles in this example.

For example, for an alloy composition such as that previously described, and for a single cycle comprising a cooling at a slow cooling rate of about 6° C. per hour, the ferritic alloy manufactured according to the invention can have a mean grain size approximately equal to 8 $\mu$m. For example, for one and the same alloy composition and for such a cycle repeated four times, the ferritic alloy manufactured according to the invention can have a mean grain size up to about 10 $\mu$m and even more.

Therefore the method of the invention allows one to obtain an optimized ferritic structure with large grains.

According to a first variant of the method of the invention, the method of manufacture of an alloy with a ferritic ODS structure that includes chromium can include at least two thermal cycles according to the invention, said thermal cycles being separated by at least one forming treatment of the alloy obtained with a ferritic ODS structure.

On the one hand, and as previously described, the thermal cycle according to the invention permits growth in the grain size of the alloy. On the other hand, this, at least one thermal cycle, allows one to obtain a ferritic ODS structure which permits, particularly through its ductility, the feasibility of the forming treatment according to the variant of the method of the invention. In effect, this, at least one thermal cycle, for example with an alloy having a composition such as those mentioned above, allows one to obtain a hardness less than or equal to 240.

The forming treatment according to the invention can comprise a forming of the ferritic ODS alloy and possibly a thermal stress relieving treatment of this alloy. The forming of the ferritic ODS alloy can be, for example, drawing, hammering, spinning, rolling and in a general way, any forming process that allows one to form sheet, tubes or other components from this alloy at a temperature ranging, for example up to 800° C. This forming can, for example be carried out by drawing or rolling in order to form cladding tubes for nuclear fuel. According to the invention, the manufactured alloy with a ferritic ODS structure is sufficiently ductile to be cold formed.

Hence thanks to the method of this invention, the forming can, for example, be carried out at ambient temperature.

According to the invention, the forming treatment can include additionally a thermal stress relieving treatment of the formed alloy, at a temperature less than AC1.

This thermal stress relieving treatment can be, for example, a classic softening treatment of an alloy. In particular, it allows a release of the residual stresses after forming of the alloy without any change in the structure of it.

The AC1 temperature is the temperature at which austenite begins to be formed during heating. For example, in the case of an alloy composition such as those previously described AC1 is equal to 775° C. Also, in this example, the thermal softening treatment can be carried out at a temperature lower than about 775° C. for example, at a temperature ranging from about 720 to about 750° C.

According to the invention, the thermal stress relieving treatment can be carried out for a period of from about 15 to about 120 minutes, for example, for a period of about 60 minutes.

This intermediate step of forming the ferritic ODS alloy therefore allows one to obtain an alloy, for example formed into a tube or into sheet, having a ferritic structure with a grain size greater than or equal to about 1 $\mu$m, for example, about 3 $\mu$m, for an alloy composition such as those previously described.

According to the invention, this alloy with a ferritic ODS structure having been subjected to at least one forming process can then be subjected to at least one thermal cycle according to the invention, in order to optimize the grain size of its structure, for example, up to about 10 $\mu$m in the previous example.

Advantageously, according to the method of the invention, the, at least one forming treatment of the ferritic ODS alloy obtained can be a thermal cycle comprising a slow rate of cooling, for example, of from about 50 to about 250° C. per hour and the, at least one thermal cycle which follows the forming treatment of the alloy can comprise an even slower rate of cooling, for example of from about 20 to about 5° C. per hour. Hence the, at least one cycle that precedes the forming of the alloy allows one to rapidly form a ductile ferritic alloy and the, at least one thermal cycle that follows the forming permits optimization of the grain size of the alloy.

According to an embodiment of this first variant of the method of the invention, a martensitic ODS blank having a composition such as those mentioned previously can be subjected, for example, to a first thermal cycle according to the invention with a slow rate of cooling of about 100° C. per hour in order to obtain a ductile alloy with a ferritic ODS structure having a mean grain size approximately equal to 3 μm. The ductile alloy can then be formed by one or more forming processes comprising, for example, a cold forming process and a softening treatment typically for one hour at 720–750° C. The formed alloy can then be subjected to one or more thermal cycles with a slow cooling rate of about 10° C. per hour in order to optimize the grain size of this alloy, for example, with four thermal cycles in this example.

This embodiment example allows one, for example, to manufacture a formed alloy having an optimized ferritic structure with large grains, having a size of about 10 μm.

The invention also relates to a method of manufacturing a martensitic ODS alloy that includes chromium, said method comprising a method of manufacturing an alloy with a ferritic ODS structure according to the invention, followed by a martensitic transformation step and a tempering of the manufactured martensitic ODS alloy, said martensitic transformation step comprising an austenitization of said alloy with a ferritic ODS structure at a temperature greater than or equal to the AC3 point of this alloy in such a way as to obtain an austenite, followed by cooling at a fast rate of cooling greater than or equal to the critical cooling rate for transformation of austenite into martensite, said fast rate of cooling being determined from a phase transformation diagram for this alloy under continuous cooling.

This method according to the invention allows one to obtain, from an alloy having a ferritic ODS structure, such as that previously described, an alloy with a martensitic ODS structure and with large grains. The conversion to a ferritic ODS structure according to the invention permits forming of the alloy even at ambient temperature.

According to the invention, the austenitization of the alloy with a ferritic ODS structure and with large grains at a temperature greater than or equal to the AC3 point can be such as that previously described.

According to the invention, the critical cooling rate for transformation of austenite into martensite can be determined from a TRC diagram such as that previously described. This rate is referred to as being "fast" in this description for the reason previously given. This fast rate can be, for example, greater than or equal to about 700° C. per hour for a composition such as those previously described.

According to the invention, the tempering can be a usual tempering treatment, for example, tempering carried out at a temperature of about 750° C. for about 1 hour. It permits stress relief of the structure.

This method allows one to manufacture a martensitic ODS alloy having an isotropic microstructure and a mean grain size that is sufficient to guarantee a mechanical strength compatible with a use of this alloy at high temperature, for example, greater than 400° C., for example between 400 and 700° C. and/or under neutron irradiation. This mean grain size is equivalent to that obtained in the ferritic ODS structure by the method of this invention.

Therefore, this method allows one, for example, to manufacture an alloy to be used for components of a nuclear power station subjected to high temperatures and/or neutron radiation, for example, cladding tubes for nuclear fuel. However it is not limited to the manufacture of these components, it also allows one to manufacture in a general way, any component subjected in its use to high mechanical and thermal stresses, for example, turbine blades in the aeronautical industry, components of a thermal power station, items used in the glass and gas industries etc.

The invention also relates to an alloy with a ferritic ODS structure that includes chromium, or a martensitic ODS structure that includes chromium, that can be manufactured by the method of the invention having a mean grain size greater than 1 μm, to such an alloy having a mean grain size greater than 5 μm, and to an alloy having a mean grain size ranging up to about 10 μm or more.

According to the invention, this alloy with a ferritic ODS structure or a martensitic ODS structure can be, for example, chosen from a group comprising an 9 Cr alloy, a 9 Cr—Mo alloy, a 9 Cr—W alloy or a 9 Cr—Mo—W alloy. Alloys of the 9 Cr—W type are called "low activity alloys" since they comprise elements with a short radioactive decay time. These alloys, conforming to this invention are therefore of interest particularly for the manufacture of components used in nuclear power stations.

According to the invention, these alloys can comprise, in addition, for example, at least one element chosen from the group comprising Cr, Mo, W, Ni, Mn, Si, C, O, N, Y and Ti, Ta, V, Nb and Zr. The concentration of each of these elements in the alloy can be that described previously in the method according to the invention.

The alloy according to the invention can therefore, for example, be of use in the manufacture of nuclear fuel cladding, and in a general way components such as those previously described.

The alloys of this invention are notably very strong mechanically and highly resistant chemically at high temperature and/or under neutron irradiation. In addition they have an isotropic structure with large grains and a reduced quantity of chromium.

Other advantages and characteristics of this invention will become apparent on reading the description that follows, given, it is understood for illustrative purposes and being non-limitative, which makes reference to the appended Figures.

EXAMPLE 1

Figure 1:
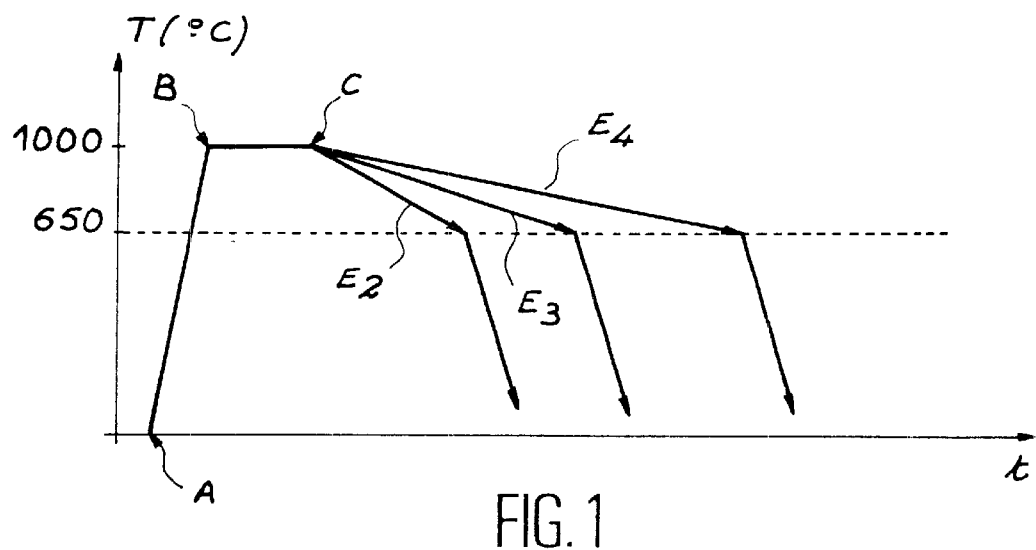
FIG. 1 is a graph illustrating thermal cycles using different cooling rates to induce the transformation from an austenite to a ferrite.

Preparation of Ferritic-martensitic Allows and Examples of Fe-9 Cr-1 Mo alloys

The alloys manufactured in this example, according to the method of the invention, are alloys of the 9 Cr-1 Mo type, based on iron, named EM10 in what follows, and strengthened by particles of yttrium oxide.

Each of these alloys is manufactured by a mechanical alloying method. An ingot having the composition of the alloy desired is atomized under argon in such a way as to obtain a 9 Cr-1 Mo pre-alloyed powder. This pre-alloyed powder is ground and mixed with yttrium oxide ($Y_2O_3$) in powder form, in an attritor under an atmosphere of argon.

Then the resulting powder is compacted by hot drawing at a temperature of 1100° C. at a drawing ratio of between 15 and 30 in order to obtain a martensitic blank that includes chromium strengthened by the dispersion of oxide particles.

Several alloys are manufactured. The chemical composition of these alloys is shown in Table 1 below. When the alloy contains dispersed oxides such as $Y_2O_3$ these are added during the mechanical alloying when the pre-alloyed powder is ground in the attritor. These alloys are named EM10+$Y_2O_3$–ODS and EM10+$Y_2O_3$+Ti–ODS below. The alloy that does not contain any oxide is named atomized EM10 below.

Table 1 below shows both the composition of a conventional EM10 alloy, that is to say an alloy obtained by a method other than mechanical alloying, for example, by a melting process, and the composition of an Fe—13Cr alloy of the type with an oxide dispersion, available commercially and named below alloy ODS-MA957 (registered trade mark) from the company INCO ALLOYS (USA).

TABLE 1

Chemical composition of alloys according to the invention, a conventional alloy and ODS-MA957 alloy

| Materials | Cr | Mo | Ni | Mn | Si | C | O | N | Y | Ti |
|---|---|---|---|---|---|---|---|---|---|---|
| Conventional EM10 | 9.0 | 1.1 | 0.6 | 0.6 | 0.4 | 0.11 | <0.004 | 0.025 | | |
| Atomized EM10 | 8.50 | 1.00 | 0.53 | 0.47 | 0.37 | 0.088 | 0.019 | 0.015 | — | — |
| EM10 + $Y_2O_3$ – ODS | 8.40 | 1.14 | 0.53 | 0.49 | 0.37 | 0.103 | 0.129 | 0.025 | 0.17 | — |
| EM10 + $Y_2O_3$ + $TiO_2$ – ODS | 8.38 | 1.13 | 0.52 | 0.50 | 0.37 | 0.122 | 0.133 | 0.024 | 0.15 | 0.23 |
| ODS-MA957 | 12.6 | 0.3 | — | — | — | 0.012 | 0.18 | — | 0.18 | 0.88 |

The temperatures AC1 and AC3 of the alloy ODS–EM10+$Y_2O_3$ the composition of which is given in Table 1 are respectively within the ranges 775–800° C. and 815–840° C.

A phase transformation diagram under continuous cooling (TRC) obtained after austenitization of this EM10+$Y_2O_3$–ODS alloy at 1000° C. for 30 minutes has allowed one to determined the critical cooling rates, designated below Vr(m), to obtain a totally martensitic product, greater than or equal to 700° C. per hour, and the critical cooling rates, designated below Vr($\alpha$), for a total transformation of the austenite into ferrite, or ($\alpha$) ferrite, less than or equal to 280° C. per hour.

Hardness values, characteristic of this EM10+$Y_2O_3$–ODS alloy of ferritic or martensitic structure, obtained according to the method of the invention have been measured. For the alloy with a ferritic structure, the hardness, designated below HV($\alpha$) is less than or equal to 244, and for the alloy with a martensitic structure, the hardness, designated below as HV(m) is greater than or equal to 460.

EXAMPLE 2

Effect of the Cooling Rate According to the Invention on the Grain Size of the EM1030 $Y_2O_3$–ODS Alloy with a Ferritic Structure In this example, the alloy manufactured is an alloy with a ferritic structure.

A series of tests are carried out starting with a martensitic EM10+$Y_2O_3$–ODS blank having the composition described in Table 1, in order to measure the effect of cooling rate on the grain size of the manufactured alloy.

Four samples of the EM10+$Y_2O_3$–ODS alloy were subjected to a first thermal cycle according to the invention, comprising an austenitization at a temperature of 1000° C. for 30 minutes followed by cooling to 650° C., at a rate that was different for each sample, and fast cooling at a common rate of 3° C. per second from 650° C.

Table 2 below shows the cooling rates for each sample (designated $E_1$, $E_2$, $E_3$ and $E_4$) as far as 650° C.

TABLE 2

Thermal cycle using different cooling rates after austenitization

| Sample | Cooling rate to 650° C. (in ° C./h) |
|---|---|
| $E_1$ | 100 |
| $E_2$ | 20 |
| $E_3$ | 10 |
| $E_4$ | 6 |

FIG. 1 is a graph illustrating the thermal cycles of $E_2$, $E_3$ and $E_4$ carried out in this example.

In this Figure, the line designated A-B-C illustrates the austenitization of the martensitic blank, obtained by mechanical alloying EM10+$Y_2O_3$–ODS, by heating to 1000° C. (line A-B), then holding the alloy at this temperature for 30 minutes (line B-C). This latter temperature corresponds to a temperature greater than the AC3 point of the alloy.

The curves $E_2$, $E_3$ and $E_4$ represent respectively the cooling rates of samples $E_2$, $E_3$ and $E_4$, which are different as far as 650° C. and then identical from this temperature.

The grain size of the samples has been measured by an image analysis technique, as a function of the cooling rate which characterizes each sample.

Table 3 below gathers together the results of these measurements.

TABLE 3

Effect of the cooling rate according to the invention on the grain size at the time of transformation of the austenite into ODS ferrite

| Cooling rate Vr in ° C./h | 100 | 20 | 12 | 6 |
|---|---|---|---|---|
| Grain Size $\alpha$ ($\mu$m) | 3 | 4.2 | 4.9 | 8 |

Figure 2:
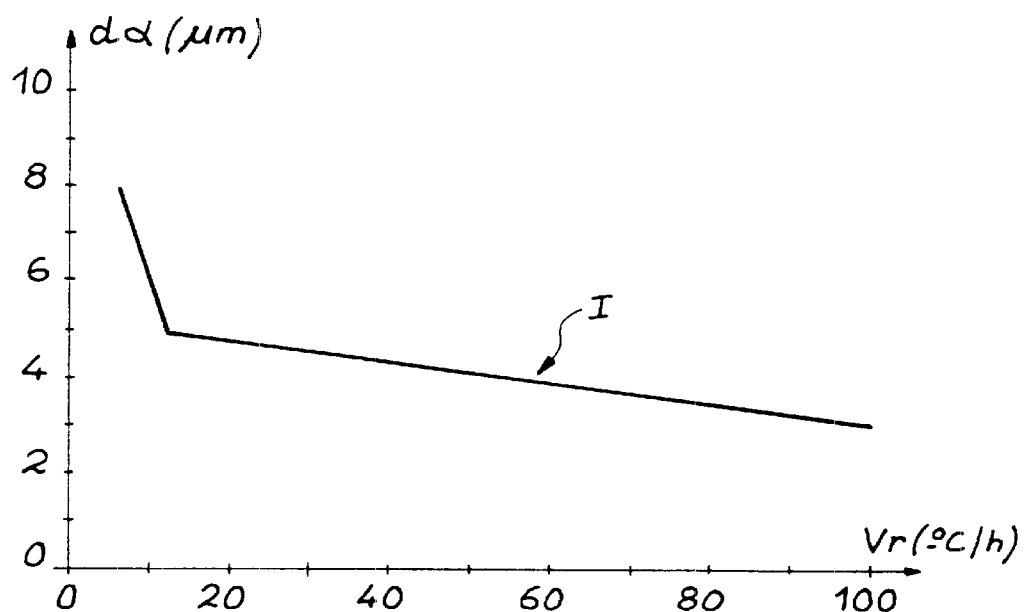
FIG. 2 is a graph illustrating the change in mean grain size as a function of the cooling rate

FIG. 2 is a graph illustrating the effect of cooling rate according to the invention on the grain size of the alloy manufactured, in particular, the curve I is a graphic representation of the values given in Table 3 above.

The results show that the lower the rate of cooling the greater the increase in the grain size of the alloy.

These results should be compared with a grain size of the order of 1 $\mu$m or less obtained after a normal treatment of the ODS–EM10+$Y_2O_3$ alloy, whatever the temperature used within a range of 1000 to 1250° C., followed by fast cooling.

EXAMPLE 3
Repetition of a Thermal Cycle According to the Invention on an Alloy with a Ferritic ODS Structure This example uses an ODS–EM10+$Y_2O_3$ alloy such as that described in Table 1 above.

A thermal cycle with slow cooling is applied in a repeated way on this alloy in such a way as to measure the effect of this repetition on the grain size of the alloy.

Figure 3:
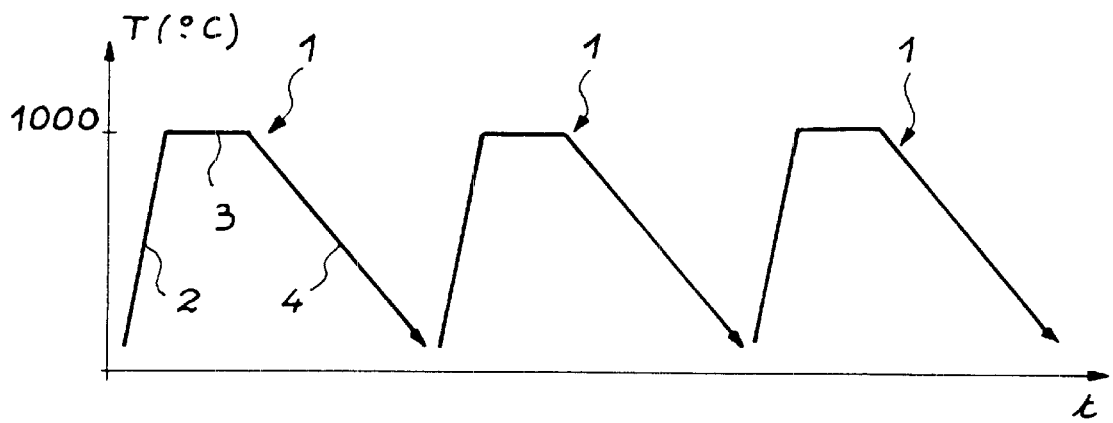
FIG. 3 is a graph illustrating several applications of a thermal cycle with a cooling rate of 6° C. per hour.

FIG. 3 illustrates diagrammatically this Example 3, reference number 1 indicating a slow thermal cycle. This thermal cycle comprises an austenitization which consists of heating the alloy to a temperature of 1000° C., indicated by reference number 2, and of holding the alloy at this temperature for 30 minutes, indicated by reference number 3; and then of cooling this alloy at a slow rate of 6° C./h, indicated by reference number 4. In this Figure, this cycle is repeated 3 times.

Measurements of the mean grain size made using an image analysis technique show that repetition of the thermal cycle according to the invention induces additional growth of the grain of the alloy. Furthermore, measurements of the hardness of the alloy, as a function of the number of thermal cycles to which it is subjected, show that the hardness of the alloy reduces with the number of thermal cycles. Table 4 below gathers together these measurements.

TABLE 4

Measurements of the grain size and the hardness of the alloy as a function of the number of thermal cycles to which it is subjected

| Number of cycles N | 0 | 1 | 2 | 3 | 4 | 5 | 6 |
|---|---|---|---|---|---|---|---|
| Grain size α (μm) | 2.5 | 8 | 8.5 | 9 | 10 | 10 | 10 |
| Hardness HV (α) | — | 208 | 195 | 190 | 187 | 185 | 185 |

Figure 4:
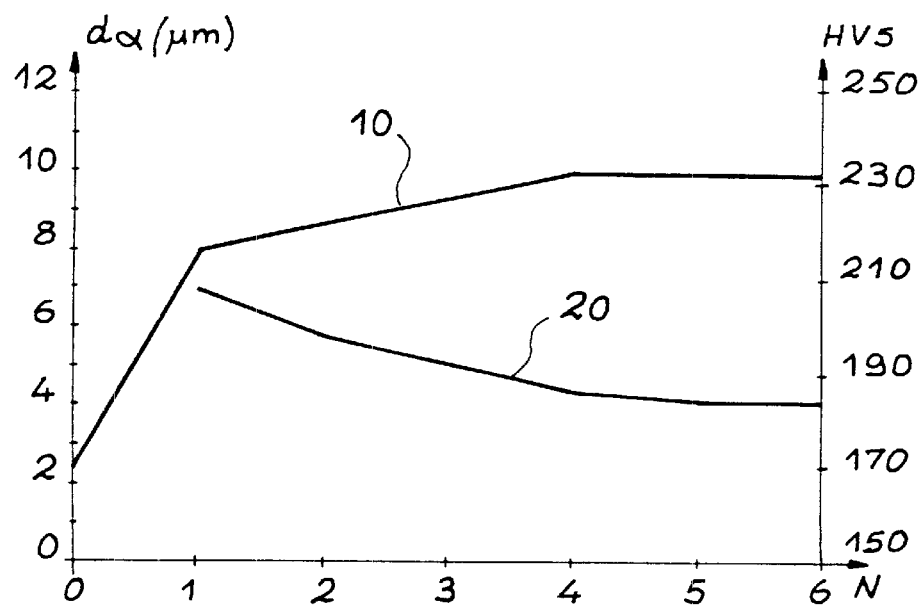
FIG. 4 is a graph illustrating the change in mean grain size and hardness as a function of the number of thermal cycles shown in FIG. 3.

FIG. 4 illustrates the results from this Table. In this Figure, the curve reference number 10 represents the change in mean grain size of the alloy as a function of the number of thermal cycles applied to this alloy, and the curve, reference number 20 represents the change in the hardness of the alloy as a function of the number of thermal cycles applied to this alloy.

These results show that the additional growth of the grain of the alloy is saturated at the end of four thermal cycles according to the invention (curve 10) and that the hardness of the alloy reduces at each application of a thermal cycle according to the invention (curve 20) and also stabilizes at the end of four cycles. The grain size achieved is 10 μm with six cycles according to the invention and the hardness of the alloy is 185 with this same number of cycles.

EXAMPLE 4
Obtaining a Martensitic ODS Structure According to the Invention

A martensitic ODS structure is obtained from a ferritic ODS structure having a grain size of 8 μm, manufactured in the previous example. The ferritic structure is subjected to a thermal treatment according to the invention comprising an austenitization at a temperature of about 1000° C. for 30 minutes, followed by a fast cooling at a rate greater than Vr(m), in this example at a rate of 700° C./hour.

The method of the invention allows one to obtain an alloy having a matrix with a single phase martensitic structure with lathe lengths that are much greater than those obtained after austenitization of the as-drawn structure of the EM10+$Y_2O_3$–ODS alloy. By passing through a ferritic ODS structure with large grains one is able to increase the grain size of the old austenite grain, that is to say, the grain size of the high temperature phase that defines the lathe length of the martensitic phase.

Observation with a transmission electron microscope allows one to check that the distribution of the $Y_2O_3$ oxide particles is not modified by the method of the invention.

On the other hand, the microstructure of the alloy manufactured by the method of the invention characterized by the presence of equiaxial grains is isotropic over both parallel and perpendicular sections with respect to the draw direction of bars manufactured from this alloy.

Therefore the method of the invention allows one to ensure that the anisotropy present in alloys manufactured according to the prior art disappears, and equivalent mechanical behavior is guaranteed whatever the direction of the load applied to the alloy. The martensitic alloy manufactured according to the invention has a hardness greater than or equal to 300 after austenitization and tempering.

Hence, depending on the application for the alloy manufactured according to the method of the invention, this alloy can be made use of in its ferritic phase or in its tempered martensitic phase.

EXAMPLE 5
Effect of the Grain Size on the Tensile Properties of EM10+$Y_2O_3$–ODS Martensitic Alloys The alloys manufactured in Example 4 above have been subjected to tensile strength measurements at high temperature. These measurements have been carried out at 650 to 750° C. on formed bars having different sizes of the old austenitic grains Table 5 below gathers together the measurements of this Example. In this Table, $Rp_{0.2\%}$ represents the elastic limit at 0.2% and $R_m$ represents the maximum tensile strength. The alloy ODS-MA957 has been recrystallised, that is to say, it has been subjected to a specific heat treatment in order to improve its mechanical hot strength. The measurement values of this alloy correspond to measurements made along a direction parallel to the forming axis of the tubes or bars. Because of its anisotropy, these values represent maximum values obtainable for the mechanical strength of ODS-MA957.

TABLE 5

Tensile strength measurements at high temperature

| | 650° C. | | 750° C. | |
|---|---|---|---|---|
| | Rp0.2% | | | |
| Materials | (MPa) | $R_m$ (MPa) | Rp0.28 (MPa) | $R_m$ (MPa) |
| Conventional EM10 without oxide dispersion | 190 | 223 | — | — |
| EM10 + $Y_2O_3$ – ODS grain size ≦ 1 μm | 233 | 285 | 117 | 152 |
| EM10 + $Y_2O_3$ – ODS according to the invention | 305 | 331 | 188 | 205 |
| ODS-MA957 recrystallised | 290 | 295 | 180 | 190 |

These values show that the martensitic alloy EM10+$Y_2O_3$–ODS according to the invention has hot mechanical properties that are better than alloy ODS-MA957 of the prior art, the latter having, in addition the disadvantages already mentioned of anisotropy and embrittlement under neutron irradiation.

Application Example

The method claimed in this patent is directly applicable to the manufacture of tubes that can be used, for example, for the cladding of fuel for a classic fast neutron reactor or for future generations of hybrid reactors, for which a material is demanded that has very high resistance to neutron irradiation within the temperature range 400–700° C. In contrast to the austenitic steels currently used as reference materials, for example, type 15-15Ti austenitic steels, the martensitic ODS alloys claimed in this patent can tolerate the high required doses of neutron radiation, greater than 200 dpa.

The method of manufacture according to the invention can be applied to the manufacture of structures that are thicker than cladding. In particular the martensitic ODS alloy claimed can be suitable for all nuclear applications that require good mechanical properties under neutron irradiation, for example for the nuts and bolts used inside a pressurized water reactor and for a structure that is highly stressed in a fusion reactor.

For all these applications, one may envisage other chemical compositions based on the 9 Cr—Mo materials and the variants referred to as "low activity" 9 Cr—W type alloys without going outside the scope of the appended Claims.

Finally, outside the nuclear field, the ferritic-martensitic ODS alloys according to the invention are suitable for any application that requires a high mechanical strength at high temperature, notably in order to manufacture a component for a thermal power station, and for the glass, gas and aeronautical industries.

What is claimed is:

1. A method of manufacturing an alloy with a ferritic ODS structure that includes chromium, said method comprising a step of preparation of a martensitic ODS blank that includes chromium by consolidating a pre-alloyed powder obtained by mechanical alloying, and a step consisting of subjecting said martensitic ODS blank to at least one thermal cycle, said, at least one thermal cycle comprising an austenitization of the martensitic ODS blank at a temperature greater than or equal to the AC3 point of this alloy in such a way as to obtain an austenite, followed by cooling of this austenite at a slow cooling rate that is less than or equal to the critical cooling rate for transformation of this austenite into ferrite in such a way as to obtain an alloy with a ferritic ODS structure, said slow critical cooling rate being determined from a phase transformation diagram for this austenite under continuous cooling.

2. A method as in to claim 1, in which the martensitic ODS blank that includes chromium includes, in addition, one or more members of the group comprising $Y_2O_3$, $TiO_2$, MgO, $Al_2O_3$, $MgAl_2O_4$, $HfO_2$, $ThO_2$ and $ZrO_2$.

3. A method as in claim 2, in which the austenitization is carried out at a temperature of from about 1000° C. to about 1250° C. for a period of from about 15 minutes to about 120 minutes.

4. A method as in claim 3, in which the austenitization is carried out at a temperature of about 1000° C. for a period of about 30 minutes.

5. A method as in to claim 1, in which the martensitic ODS blank that includes chromium includes, in addition, one or more elements chosen from the group comprising Mo, W, Ni, Mn, Si, C, O, N, Y, Ti, Ta, V, Nb, Zr.

6. A method as in claim 5, wherein an alloy composition comprises chromium of from about 7 to about 12% by weight, Mo of from about 0.3 to about 1.5% by weight, W of from about 0.5 to about 3% by weight, Ni of up to about 1% by weight, Mn of up to about 1% by weight, Si of up to about 1% by weight, C of from about 0.02 to about 0.2% by weight, O of from about 0.02 to about 0.3% by weight, N of up to about 0.15% by weight, Y of up to about 1% by weight and Ti of up to about 1% by weight in the alloy, the remainder being iron.

7. A method as in claim 1, in which the martensitic ODS blank that includes chromium comprises from about 7 to about 12% by weight of chromium equivalent in the alloy.

8. A method as in claim 1, comprising at least two thermal cycles, said thermal cycles being separated at least once, by at least one forming treatment of the alloy obtained with a ferritic ODS structure.

9. A method as in to claim 8, in which the forming treatment of the alloy with a ferritic ODS structure comprises forming the alloy with a ferritic structure followed by a thermal stress relieving treatment of the alloy formed at a temperature lower than AC1.

10. A method as in to claim 9, in which the forming of said alloy is a cold forming.

11. A method as in to claim 9, in which the stress relieving treatment is a thermal softening treatment at a temperature below about 775° C.

12. A method as in claim 1, in which the slow cooling rate of at least one thermal cycle is less than or equal to about 280° C. per hour.

13. A method as in claim 1, in which the slow cooling rate of at least one thermal cycle is less than or equal to about 100° C. per hour.

14. A method as in claim 1, in which the slow cooling rate of at least one thermal cycle is less than or equal to about 20° C. per hour.

15. A method as in claim 1, in which the preparation of the martensitic ODS blank that includes chromium is carried out by mechanical alloying of a pre-alloyed powder obtained by atomization under argon of an ingot, that has a composition corresponding to that of the manufactured alloy and adding oxides.

16. A method of manufacturing a nuclear fuel cladding comprising an alloy with a ferritic ODS structure that includes chromium, said method comprising a method of manufacturing said alloy as in claim 1.

17. A method of manufacturing a martensitic ODS alloy that includes chromium, this method comprising a method of manufacturing an alloy with a ferritic ODS structure according to any one of claims 1 to 12, followed by a martensitic transformation step and a tempering of the manufactured martensitic ODS alloy, said martensitic transformation step comprising an austenitization of the alloy with a ferritic ODS structure at a temperature greater than or equal to the AC3 point of this alloy in such a way as to obtain an austenite, followed by cooling of this austenite at a fast rate of cooling greater than or equal to the critical cooling rate for transformation of austenite into martensite, said fast rate of cooling being determined from a phase transformation diagram for this alloy under continuous cooling.

18. A method as in to claim 17, in which the fast rate of cooling is greater than or equal to about 700° C. per hour.

19. A method as in claim 17, in which the tempering is carried out at a temperature of about 750° C. for about 1 hour.

* * * * *